United States Patent [19]

Ellingson

[11] Patent Number: 5,601,912
[45] Date of Patent: Feb. 11, 1997

[54] COMPOSITE CELLULAR COEXTRUSION WITH RECYCLED COMPONENTS

[76] Inventor: Robert Ellingson, 14101 Industrial Park Blvd., NE., Covington, Ga. 30209

[21] Appl. No.: 429,590

[22] Filed: Apr. 27, 1995

[51] Int. Cl.⁶ .................................................. B32B 5/18
[52] U.S. Cl. .............................. 428/318.6; 428/319.9; 428/218; 428/212; 428/178; 428/187
[58] Field of Search ..................... 428/213, 215, 428/218, 318.6, 319.3, 319.7, 319.9, 212, 187, 178

[56] References Cited

U.S. PATENT DOCUMENTS

| | | | |
|---|---|---|---|
| 4,464,439 | 8/1984 | Castelein | 428/517 |
| 4,940,629 | 7/1990 | Weber et al. | 428/213 |
| 5,128,196 | 7/1992 | Luetkens, Jr. et al. | 428/213 |
| 5,157,886 | 10/1992 | Azzar et al. | 52/717.05 |
| 5,199,237 | 4/1993 | Juntunen | 52/287.1 |
| 5,200,432 | 4/1993 | Bopp et al. | 521/40.5 |
| 5,260,110 | 11/1993 | Nichols | 428/2 |
| 5,330,596 | 7/1994 | Gusavage et al. | 156/78 |

Primary Examiner—Kathleen Choi
Attorney, Agent, or Firm—Isaf, Vaughan & Kerr; Steven D. Kerr

[57] ABSTRACT

The invention comprises a thermoplastic coextruded material comprised at least partially of recycled polystyrene. The material has a blown cellular core and a thin, high-impact, cap. In a preferred embodiment the material is used as crown molding and is comprised of a core having about 15% high-impact polystyrene and a cap of high-impact polystyrene. In the preferred embodiment the core comprises 20–85% recycled polystyrene.

3 Claims, 1 Drawing Sheet

COMPOSITE CELLULAR COEXTRUSION WITH RECYCLED COMPONENTS

FIELD OF THE INVENTION

The present invention relates generally to thermoplastic coextrusions and more particularly to the thermal coextrusion of articles having a blown cellular core at least partially composed of recycled thermoplastic material and capped with a thin high-impact plastic material to provide strength and a colorable surface.

BACKGROUND OF THE INVENTION

Wood has long been the material of choice for products such as crown molding, baseboards, door casings, and molding of all kinds. However, as the timber supply dwindles and concerns for the environment mount, wood has become more and more expensive both to procure and to machine into molding and other parts. In addition, the general quality of timber has declined over the years such that some high grades of lumber common 50 years ago are now simply not available.

Various attempts have been made to produce an extruded plastic material that can be used as a replacement for wooden building construction articles such as crown molding. Most of these attempts have resulted in an extruded cellular thermoplastic product of relatively low quality. While such products have been used in low end applications, they nevertheless tend to be plagued with various inherent problems and shortcomings. For example, in order to be economically competitive with wood, these thermoplastic products must be made with a relatively low density to minimize the amount of plastic in the material while maximizing the volume of air. The problem is that, when reduced to these densities, the extruded material lacks the structural constitution to hold nails and to be cut and worked like wood. Thus, the material is often glued to a wall and various contrivances are sometimes used to join pieces together at corners.

Another problem with prior art extruded moldings is that of providing a surface that either resembles wood or that is suitable for receiving and holding paint. A common prior art method of providing such a surface has been simply to cool the surface side of the extrusion as it exits the extruder. This prevents the blowing agent from expanding in the region of the surface and creates a relatively more dense and harder surface. However, this surface still tends to be somewhat robbery and does not hold nails or take paint well.

Polystyrene cellular materials are well known in the art. Polystyrene foams are used as coffee cups, packaging for food and industrial products, and as insulation board. Polystyrene foam, however, is brittle and would not serve as a wood replacement in and of itself due to its inability to be nailed, sawed, and generally manipulated without breaking. Rubber-modified styrene polymers, however, are more impact resistant. Such copolymers, called high-impact polystyrenes (HIPS), are sometimes used when toughness, flexibility, and resiliency are desired. Oftentimes, a mixture of HIPS and general purpose, or crystalline, polystyrene (GPPS) is used so that a product will have specific desired properties.

A method that has been applied to change the properties of GPPS products to produce a more suitable wood substitute is by utilizing multilayer structures. For example, U.S. Pat. No. 5,128,196 teaches a thermoplastic multi-layer sheet useful for packaging applications which comprises at least two layers, one of which is a thermoplastic foam layer and one which is a multi-resin layer comprising a mixture of at least three resins, one of which is an oxygen barrier resin. Multi-layer sheets are typically made by a coextrusion process requiting that the various layers will bond to each other. While this method is an improvement, it nevertheless is expensive and specialized and not generally suited to the production of wood substitute.

The prior art does not teach a foam polystyrene material useful as crown molding and the like. The compositions which have been taught do not provide adequate stiffness combined with non-brittleness so they can be handled and will not fracture when a nail is driven through while mounting. In addition, prior art products do not provide a surface which can be dyed or painted to a desired color.

Recycled polystyrene commonly is inconsistent in composition. Typically, the major component is GPPS. However, the recycled material also may comprise HIPS and other copolymers, dyes, grease, and other contaminants. The separation of pre-recycled material into various classes on the basis of composition is time and expense prohibitive to many recycled polystyrene providers. Therefore, the incorporation of recycled polystyrene into a finished product requires a certain amount of trial and error to arrive at consistent production results. However, the use of recycled polystyrene in constructive ways is of vital importance to our environment and may also be economically beneficial.

Foamed, also known as cellular, thermoplastic sheets are typically made by extrusion using a blowing agent, whereby polystyrene resin, for example, is heated in an extruder and is mixed in the extruder with a blowing agent and then extruded through a die and allowed to expand to form a polystyrene foam sheet. Common blowing agents are p,p'-oxybis (benzenesulfonyl hydrazide), azodicarbamide, alkaline earth metal carbonates or bicarbonates such as calcium carbonate, magnesium carbonate or sodium bicarbonate, and combinations of an alkaline earth metal carbonate or bicarbonate and one or more organic acids such as citric acid. As mentioned above, however, foamed thermoplastic alone is not suitable as a material for producing a substitute for wood molding or the like.

Thus, there is a need for an economically practical wood substitute appropriate for use as crown molding and the like that is stiff enough to hold its shape, that is not so brittle that it shatters upon impact, and that is provided with a surface suitable for coloring just as is a wood surface. There is also wide-spread need for providing constructive uses for recycled materials and for recycled polystyrene in particular. In addressing both of these needs simultaneously, the present invention provides a coextruded thermoplastic component comprised at least partially of recycled materials, suitable for use as a substitute for wood molding and having a constitution sufficient to be nailed and an outer surface suitable for painting.

SUMMARY OF THE INVENTION

Accordingly, it is an object of the invention to overcome the deficiencies of the prior art as illustrated above in the manufacture of an extruded thermoplastic material comprised at least partially of recycled plastic that can be used as a replacement for wood building articles.

It is also an object of the invention to provide a thermoplastic material having a blown cellular core at least partially composed of recycled thermoplastic material capped with a layer of relatively more dense plastic material that provides strength and a colorable surface.

It is an additional object of the present invention to provide a wood substitute which significantly comprises recycled plastic.

It is a further object of the present invention to provide an economical thermoplastic building material which will substitute for wood and which is suitable for use as a building article wood substitute.

Thus, in accordance with the above objects, a building material is provided which is comprised of a thermoplastic. The thermoplastic article has a blown cellular core which is at least partially composed of recycled thermoplastic material. In addition, the blown cellular core is capped with a layer of relatively denser plastic material which provides strength, nail holding capacity, and a paintable or otherwise colorable surface for the article.

In a preferred embodiment, the blown cellular core is comprised of polystyrene. The core may be comprised of from about 5% to 35% HIPS. Most preferably, the core is comprised of about 15% HIPS. The blown cellular core is also comprised of between about 20% to about 85% recycled polystyrene. The product is not economically practical if less than 20% recycled material is used. On the other hand, the material must be at least 5% HIPS in order m give the component the needed resiliency and handleability. Because recycled polystyrene materials may comprise varying amounts of HIPS as well as other additives and modifiers, including dyes, grease, etc., the particular percentage of recycled material used may vary from batch to batch in order to give the desired qualities to the resulting blown cellular core. It is preferable that the blown cellular core has a specific gravity less than about 0.75 and preferably from about 0.30 to 0.75.

A building article prepared with recycled material as described above has the disadvantage that the surface is uneven and is not dyeable or paintable. This problem has been solved in the present invention by providing the blown cellular core with a thin coextruded outer layer that provides strength, a smooth surface, and that is colorable. The thin cap is made of a plastic material such as polystyrene. The important factor is that it be able to chemically bond to the blown cellular core. Any material which may do this is suitable for use in the present invention. Most preferably, the cap is made of HIPS.

The above article is made by thermal coextrusion using known techniques. Foamed polystyrene is typically made by extrusion using a blowing agent. Polystyrene resin is heated in an extruder and is mixed in the extruder with a blowing agent and then extruded through a die and allowed to expand to form the desired shape.

DETAILED DESCRIPTION

Figure 1:
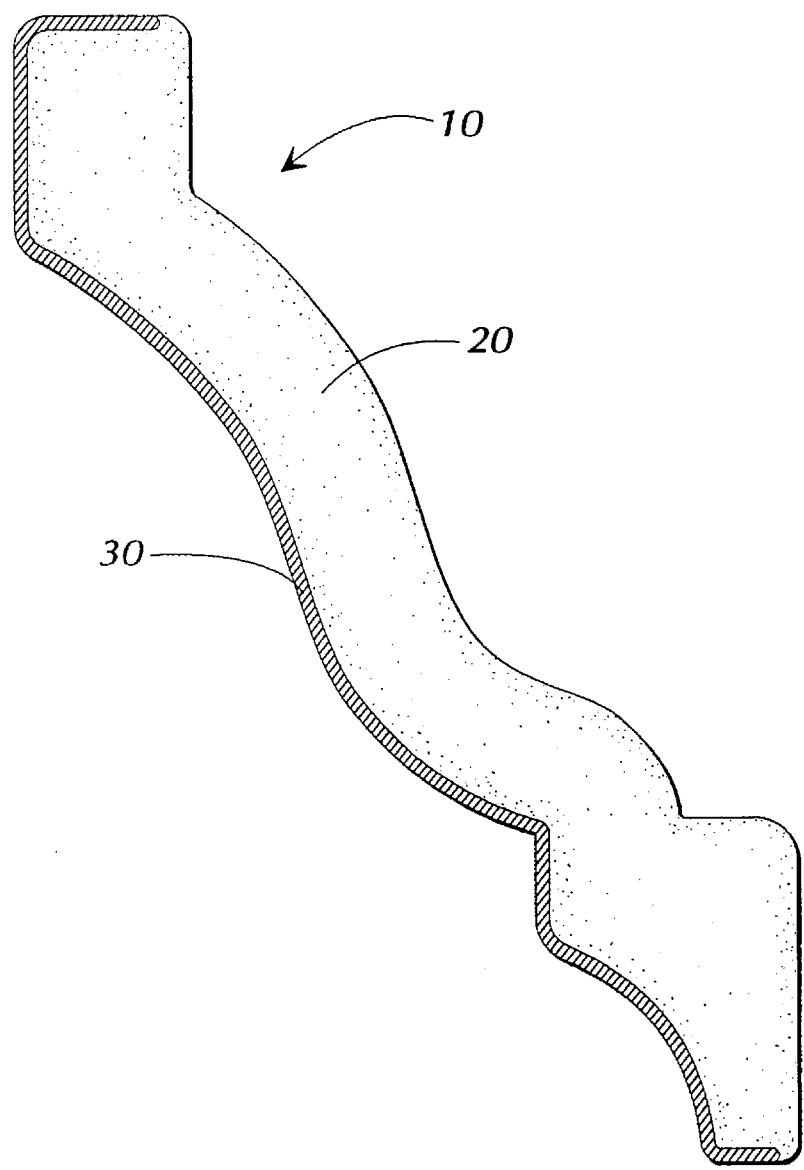
FIG. 1 is a view of the invention, shown as a piece of crown molding.

Referring now in more detail to the drawing, the present invention, in a preferred embodiment, comprises an article made of thermoplastic ingredients suitable for use in building construction and similar applications. The article has a blown cellular core which is at least partially comprised of recycled thermoplastic material. The blown cellular core is capped with a thin thermoplastic material which provides strength and a paintable surface. FIG. 1 shows one embodiment of the invention, a piece of crown molding 10, having a blown cellular core 20 with a cap 30.

The blown cellular core is comprised of a thermoplastic material and may be prepared by techniques which are known in the art. For example, it is anticipated that the core may be comprised of any foamed plastic which yields a durable, non-brittle component. Importantly, the material must be able to receive a nail or other fastening device without breaking or cracking. The material also must capture or grasp the nail in the manner of wood. Plastics which have been formulated into foamed materials are nylon, polycarbonate, polyethylene, polypropylene, polyvinylchloride, polyurethane, and polystyrene. In a preferred embodiment, the blown cellular core of the present invention comprises from about 5% to 35% HIPS such as that manufactured by BASF Corporation as product NPR 432000. This material is a rubber modified polystyrene, that is, a copolymer of styrene and 1,3-butadiene. High melt HIPS is preferable but low melt HIPS such as NPR 4100X0 by BASF may also be used. The percentage of HIPS will vary depending upon the desired qualities of the final product. If more than about 35% HIPS is used, the product will be too flexible or rubbery. If less than about 5% HIPS is used, the product will be too brittle. Most preferably, the core comprises about 15% high melt HIPS.

The HIPS is combined with from between 20–85% recycled polystyrene. By recycled polystyrene it is meant polystyrene which has been previously used in various applications. This material may include various modifiers and/or additives such as dyes, paints, grease, and additional polymeric compounds. Because the composition of the recycled material is generally variable from supplier to supplier and from batch to batch the final product of the present invention must be evaluated before the exact composition of recycled material can be determined. The product is not economically practical if less than about 20% recycled material is not used. On the other hand, if the recycled material is substantially pure, an amount up to about 85% can be used. The remainder of the polymeric composition of the blown cellular core is comprised of GPPS such as, for example, that sold by the BASF Corporation as product NPR 212000.

The above composition is mixed in an extruder and the blowing agent is added. Methods of producing foamed or cellular thermoplastic are known in the art and may be used. The combined thermoplastic and blowing agent is extruded through a die whereupon it expands to form the blown cellular core.

If the recycled PS contains an especially large percentage of thermoplastics other than GPPS, such as other polymer ingredients, dyes, grease or other contaminants, an amount towards the low end of the range 20–85% may have to be used. If, however, the recycled PS is substantially all GPPS, up to 85% recycled material may be used. For various applications of the material, that is, for the construction of various building articles, various properties of the component are desired. For most applications, a cellular core having a specific gravity of below 0.75 is preferred and the specific gravity, most preferably, is between about 0.40 to 0.75.

The blown cellular core is coextruded with a capping layer of a thin plastic material. The cellular core is capped with the capping layer to provide an outer surface which is smooth as opposed to the rough and uneven nature of the core and which adds strength and sturdiness to the component. Many types of material would be suitable for use as the capping layer. One important factor is that the capping layer be made of a thermoplastic material which is compatible with the cellular core material and which will bond permanently to the core. The capping layer also should be composed of a high-impact capacity thermoplastic so that it will provide support to the core and also must be of suitable material to be dyeable or paintable or otherwise colorable.

One material which has been found to be suitable as a cap for the above described preferred embodiment of the invention is HIPS. Both low melt and high melt HIPS may be used, although high melt is most preferable. In one example, HIPS from BASF Corp., NPR 432,000, was used successfully. In this embodiment, a cap having a thickness of about 0.0625 inches provided the desired properties to the article. However, the cap may be as thin as 0.003 inches and, most preferably, has a thickness from about 0.01 to 0.02 inches. A cap of HIPS can be painted a desired color. Alternatively, it can be primed for painting as a step in the extrusion process itself and delivered to the user ready for receiving paint. The material can also be dyed a desired color by including a compatible dye in the coextruder.

The preceding is set forth to illustrate specific embodiments of the invention and is not intended to limit the scope of the compositions and methods of the present invention. Additional embodiments and advantages within the scope of the claimed invention will be apparent to one of ordinary skill in the art. For example, the application of this invention to produce crown molding has been illustrated. Obviously, however, many other articles may be fabricated through the method of this invention. Accordingly, numerous additions, deletions, and modifications may be made to the illustrated embodiment without departing from the spirit and scope of the invention as set forth in the claims.

What is claimed is:

1. A thermoplastic article for use in building construction comprising:
   a blown cellular core of polystyrene, including about 15% high-impact polystyrene and from about 20–85% recycled polystyrene and having a specific gravity of from about 0.30 to about 0.75;
   a coextruded cap layer comprising high-impact polystyrene, said cap layer having a thickness of from about 0.01 to 0.02 inches; and
   said thermoplastic article is in the shape of crown molding.

2. A thermoplastic crown molding for use in building construction, comprising:
   a blown cellular core of a first material comprising from about 20–85% recycled polystyrene and having a specific gravity of from about 0.30 to 0.75; and
   a coextruded cap layer consisting essentially of high-impact polystyrene, said cap layer having a thickness of from about 0.01 to 0.02 inches.

3. A thermoplastic coextruded article for use in building construction comprising a blown cellular core of a first thermoplastic material comprising from about 20 to 85% recycled polystyrene and having a specific gravity of from about 0.30 to 0.75, a coextruded thermoplastic cap layer consisting essentially of high impact polystyrene, said cap layer having a thickness from about 0.01 to 0.02 inches, said thermoplastic article is in the shape of a decorative crown molding.

* * * * *